United States Patent
Tsai et al.

(10) Patent No.: US 10,702,912 B2
(45) Date of Patent: Jul. 7, 2020

(54) COMPOSITE MANUFACTURING METHOD WITH EXTRUDING AND TURNING PROCESSES

(71) Applicant: INTAI TECHNOLOGY CORP., Taichung (TW)

(72) Inventors: Yung-Fang Tsai, Taichung (TW); Yi-Jung Chen, Taichung (TW)

(73) Assignee: INTAI TECHNOLOGY CORP., Taichung (TW)

( * ) Notice: Subject to any disclaimer, the term of this patent is extended or adjusted under 35 U.S.C. 154(b) by 768 days.

(21) Appl. No.: 15/347,772

(22) Filed: Nov. 9, 2016

(65) Prior Publication Data

US 2018/0126432 A1 May 10, 2018

(51) Int. Cl.
| | |
|---|---|
| *B23P 15/00* | (2006.01) |
| *B23P 23/02* | (2006.01) |
| *B21C 37/06* | (2006.01) |
| *B21J 7/14* | (2006.01) |
| *B23B 25/00* | (2006.01) |
| *B21J 13/02* | (2006.01) |

(52) U.S. Cl.
CPC .............. *B21J 7/14* (2013.01); *B21J 13/02* (2013.01); *B23B 25/00* (2013.01)

(58) Field of Classification Search
CPC ... B21J 13/02; B21J 7/14; B23B 25/00; B23P 15/00
See application file for complete search history.

(56) References Cited

U.S. PATENT DOCUMENTS

| | | | | |
|---|---|---|---|---|
| 6,769,175 B2 * | 8/2004 | Wagner | ............... | B21K 1/36 |
| | | | | 165/80.3 |
| 2011/0302768 A1 * | 12/2011 | Tian | ............... | B23P 15/00 |
| | | | | 29/596 |
| 2017/0305078 A1 * | 10/2017 | Chtourou | ............... | B29C 70/526 |

FOREIGN PATENT DOCUMENTS

| | | |
|---|---|---|
| CN | 101198424 A | 6/2008 |
| CN | 102744342 B | 9/2014 |
| CN | 104191246 A | 12/2014 |
| JP | 2001179797 A * | 7/2001 |
| TW | 201412429 A | 4/2014 |
| TW | 201533363 A | 9/2015 |
| TW | I504471 B | 10/2015 |

* cited by examiner

*Primary Examiner* — Sara Addisu
(74) *Attorney, Agent, or Firm* — CKC & Partners Co., LLC

(57) ABSTRACT

A composite manufacturing method with extruding and turning process for extruding and turning a workpiece includes a clamping step, an isolating step, an extruding step and a turning step. The composite manufacturing method is used for manufacturing a surgical instrument. The clamping step is for positioning a clamping portion of the workpiece by a lathe chuck of the lathe apparatus. The isolating step is for blocking a lathe extruding force via an isolating portion of an extruding apparatus. The extruding step is for extruding a processing end portion of the workpiece by the extruding apparatus and generating the lathe extruding force transmitted toward a clamping portion of the workpiece. The turning step is for turning the processing end portion of the extruded workpiece by a lathe apparatus. The extruding apparatus is disposed on the lathe apparatus.

7 Claims, 13 Drawing Sheets

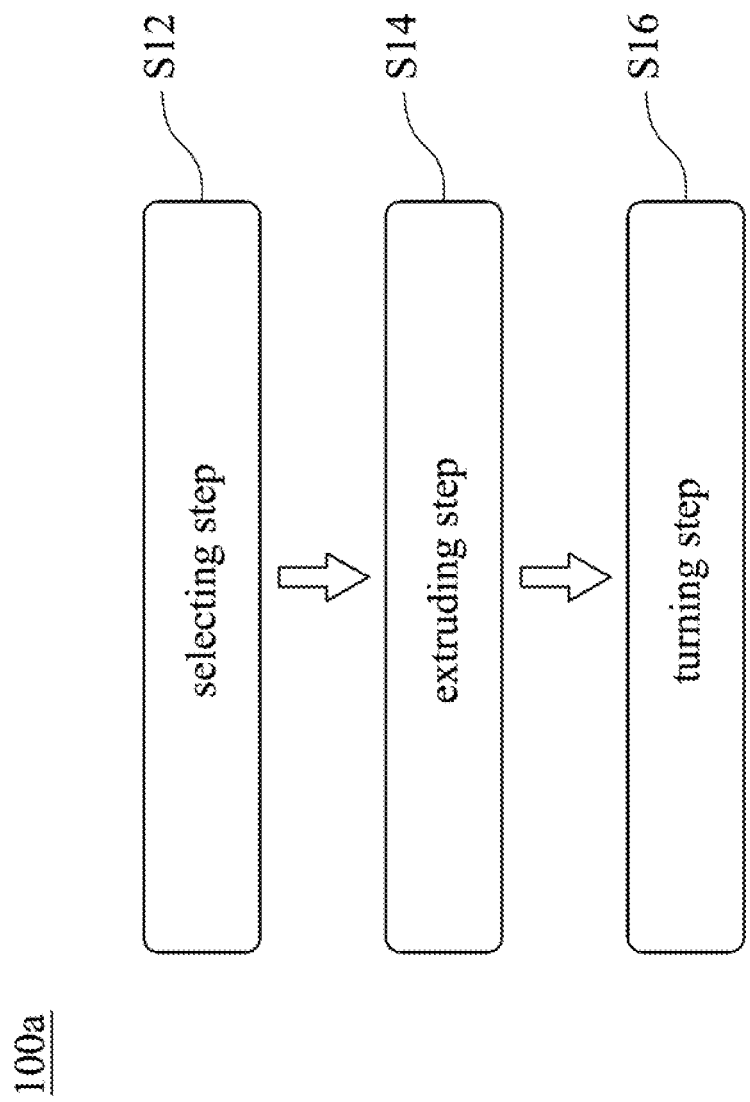

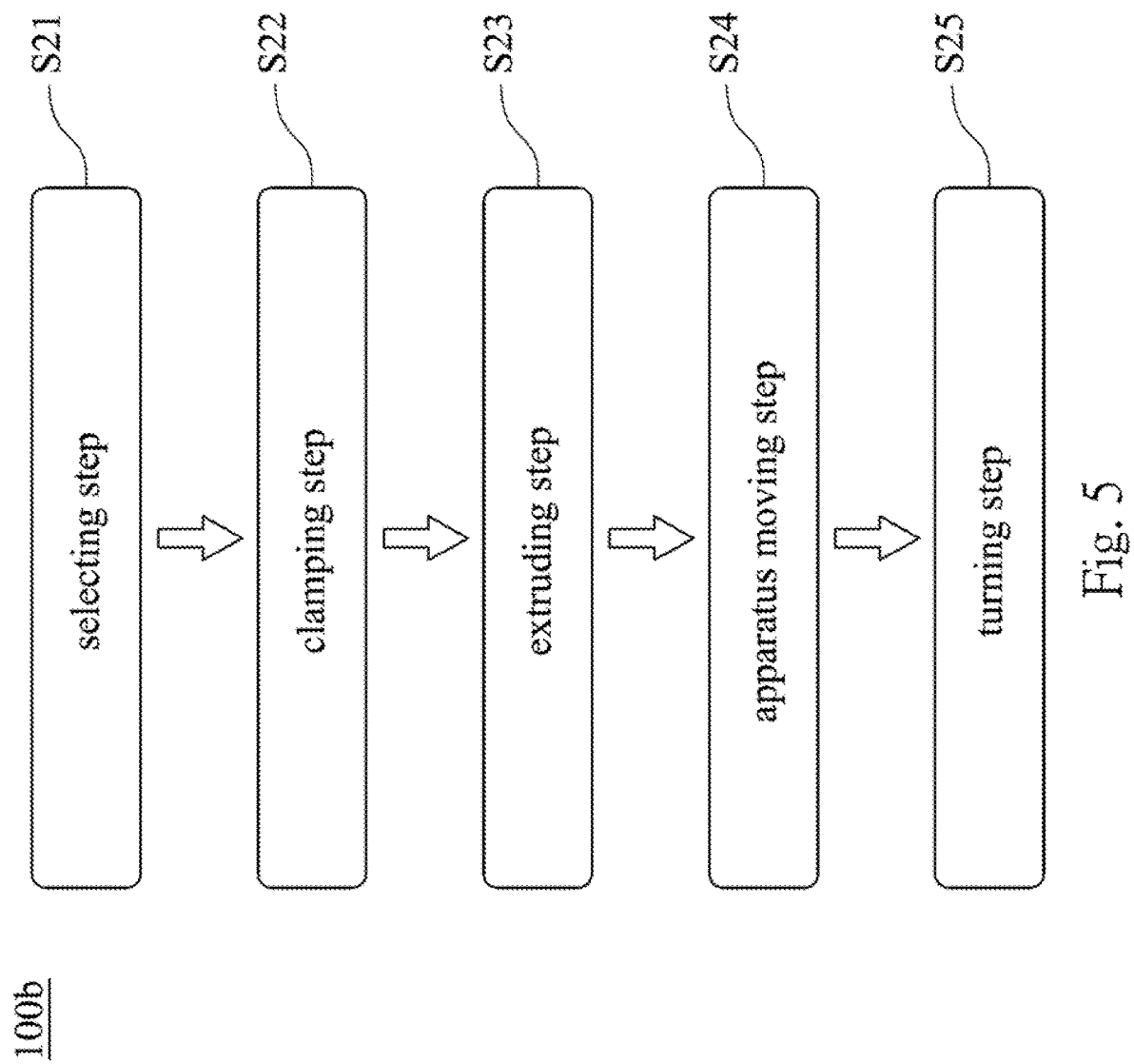

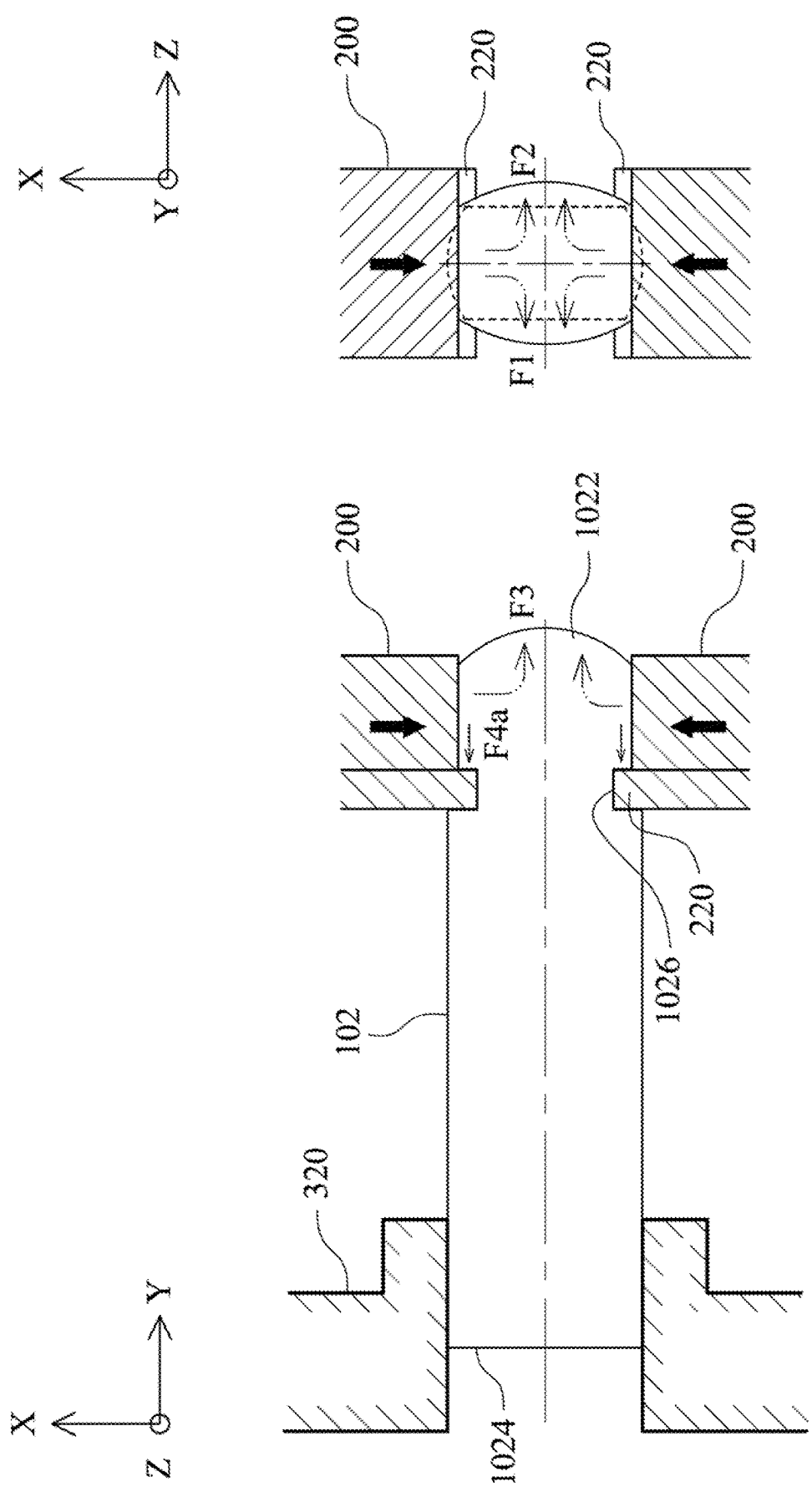

US 10,702,912 B2

COMPOSITE MANUFACTURING METHOD WITH EXTRUDING AND TURNING PROCESSES

BACKGROUND

Technical Field

The present disclosure relates to a composite manufacturing method. More particularly, the present disclosure relates to a composite manufacturing method with extruding and turning processes.

Description of Related Art

Composite manufacturing apparatus and processes are well-known. Such apparatus and processes have been used to manufacture a workpiece for many years in the commercial production. In the manufacture of semifinished products, such as rod, tube, strip and sheet material, machining of the composite manufacturing type can be employed to form the final product.

One conventional composite manufacturing method can be employed to manufacture a workpiece, such as a turning process combined with a cutting process. However, having regard to the hardness of metal material, the turning process combined with the cutting process is unsuitable and uneconomical, especially for mass production. The processing time of cutting-type method is too long to perform the mass production. Such costs are particularly excessive for making a limited number of the workpieces.

Another conventional composite manufacturing method can be used to manufacture the workpiece, such as a hot-pressing process combined with a turning process. However, the conventional composite manufacturing method has hitherto been unsuccessful, since very high deformation forces were needed in these processes, and the structure of the material was extensively destroyed in the course of the working operation. In addition, an external heat source is required in the conventional composite manufacturing method, so that the cost of the conventional composite manufacturing method is too high, and it is not suitable for the mass production. Therefore, a composite manufacturing method having simple structure and low cost for mass production is commercially desirable.

SUMMARY

According to one aspect of the present disclosure, a composite manufacturing method with extruding and turning processes for extruding a workpiece, turning the workpiece and manufacturing a surgical instrument includes an extruding step and a turning step. The extruding step is for extruding a processing end portion of the workpiece by an extruding apparatus so as to increase a radial length and an axial length of the workpiece. The turning step is for turning the processing end portion of the extruded workpiece by a lathe apparatus. The extruding apparatus is disposed on the lathe apparatus.

According to another aspect of the present disclosure, a composite manufacturing method with extruding and turning processes for extruding and turning the workpiece includes an isolating step, an extruding step and a turning step. The isolating step is for blocking a lathe extruding force via an isolating portion of an extruding apparatus. The extruding step is for extruding a processing end portion of the workpiece by the extruding apparatus and generating the lathe extruding force transmitted toward a clamping portion of the workpiece. The turning step is for turning the processing end portion of the extruded workpiece by a lathe apparatus. The extruding apparatus is disposed on the lathe apparatus.

BRIEF DESCRIPTION OF THE DRAWINGS

The present disclosure can be more fully understood by reading the following detailed description of the embodiment, with reference made to the accompanying drawings as follows:

FIG. 1 shows a flow chart of a composite manufacturing method with extruding and turning processes according to one embodiment of the present disclosure;

FIG. 5 shows a flow chart of a composite manufacturing method with extruding and turning processes according to another embodiment of the present disclosure;

FIG. 10A shows a schematic view of an extruding step of the composite manufacturing method of FIG. 8;

FIG. 10B shows another schematic view of the extruding step of the composite manufacturing method of FIG. 8;

DETAILED DESCRIPTION

Figures 2A, 2B:
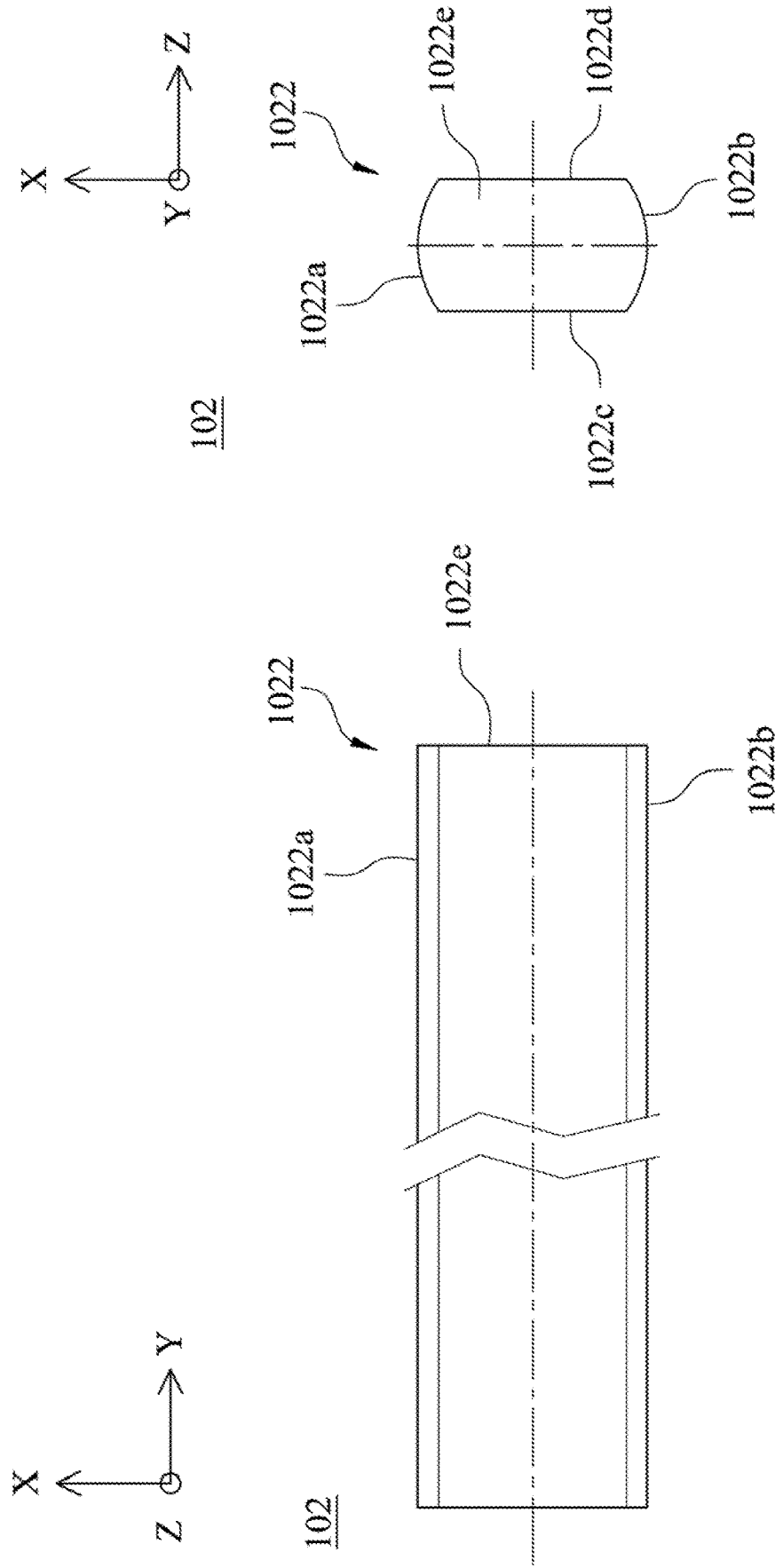
FIG. 2A shows one schematic view of a workpiece of a selecting step of the composite manufacturing method of FIG. 1.
FIG. 2B shows another schematic view of the workpiece of the selecting step of the composite manufacturing method of FIG. 1.
Figures 3A, 3B:
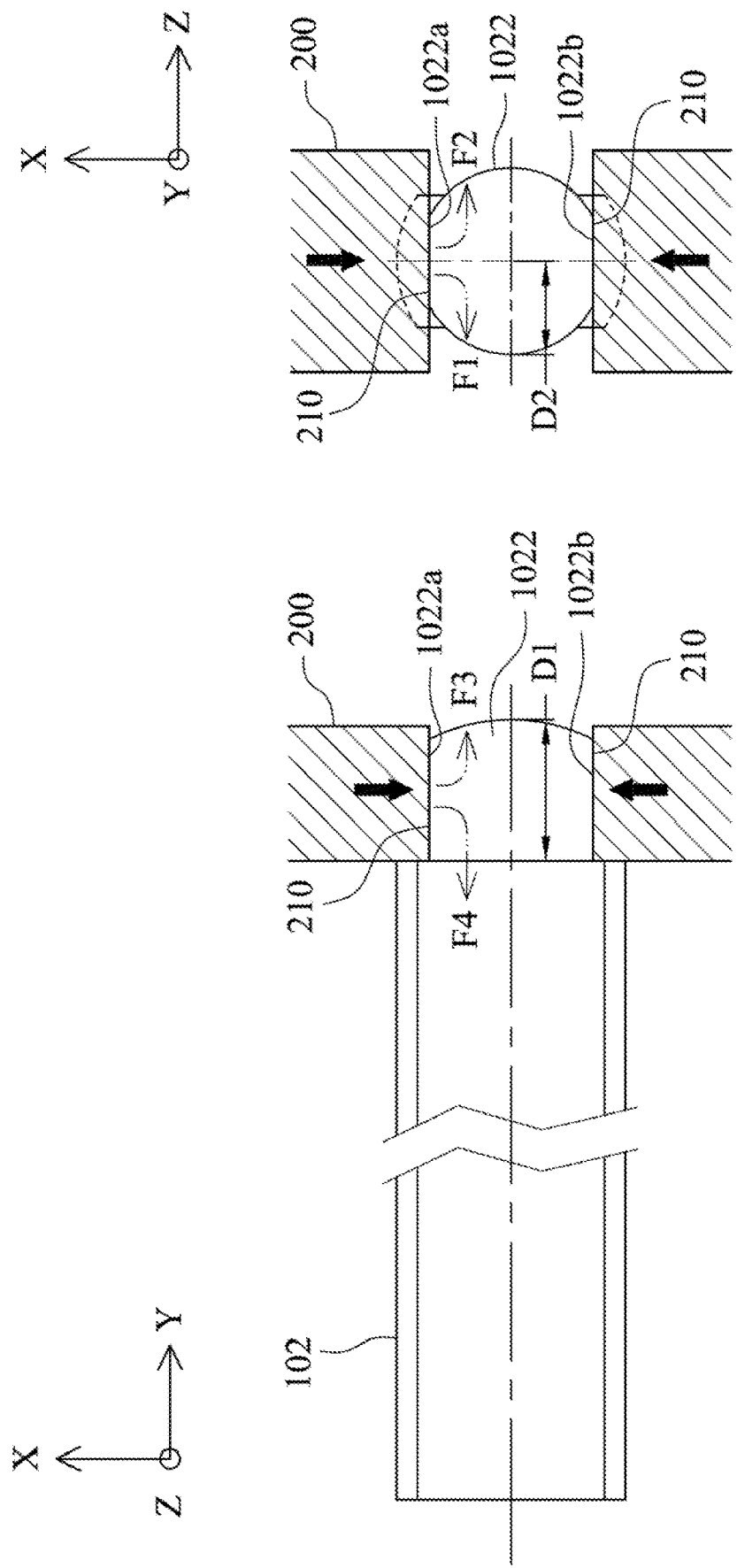
FIG. 3A shows a schematic view of an extruding step of the composite manufacturing method of FIG. 1.
FIG. 3B shows another schematic view of the extruding step of the composite manufacturing method of FIG. 1.
Figure 4B:
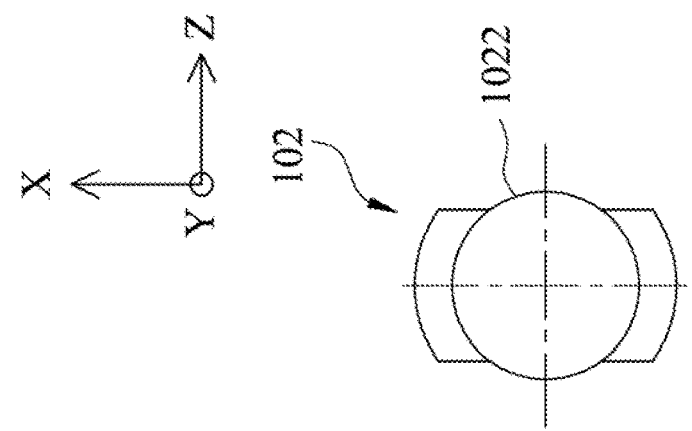
FIG. 4B shows another schematic view of the turning step of the composite manufacturing method of FIG. 1.
Figure 4A:
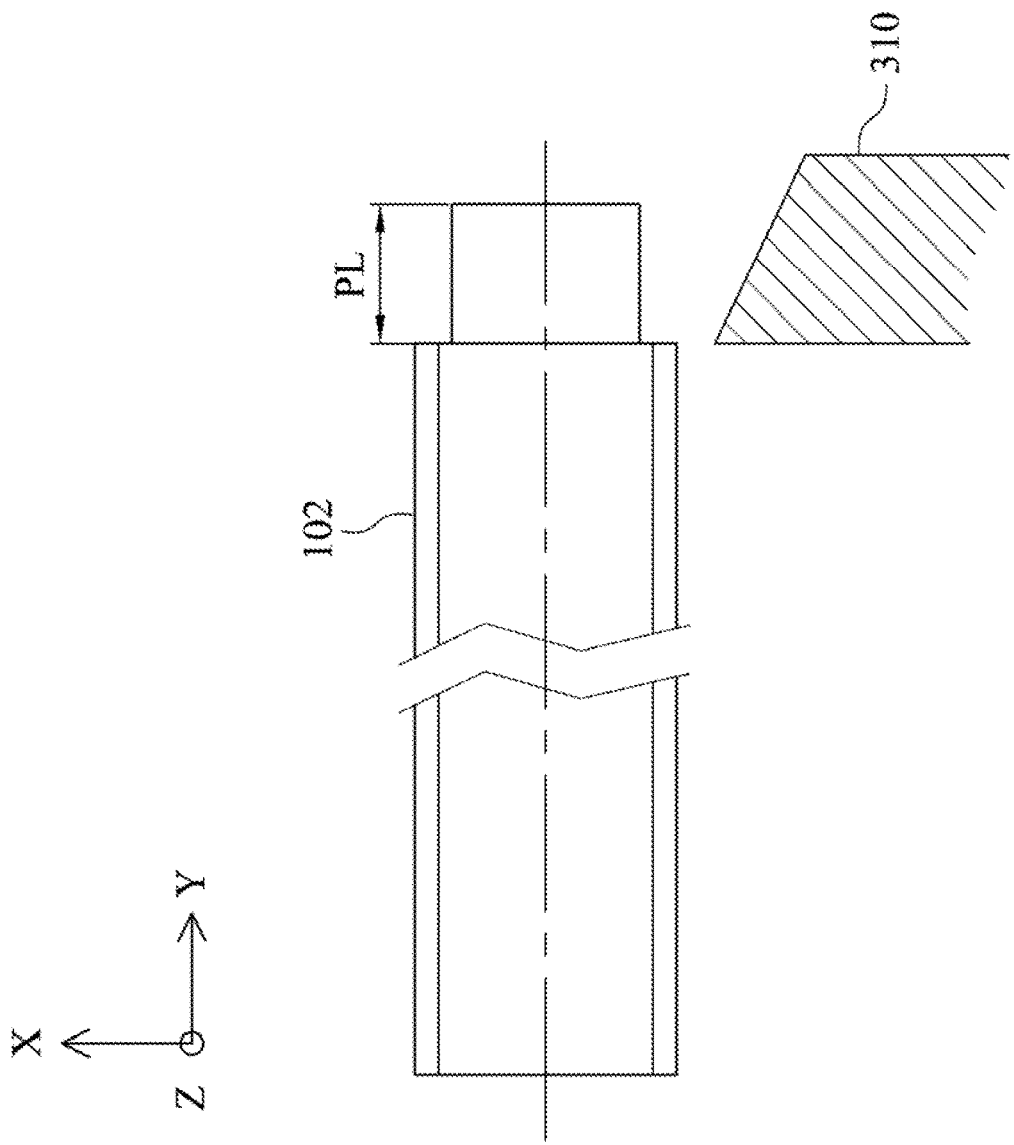
FIG. 4A shows a schematic view of a turning step of the composite manufacturing method of FIG. 1.

FIG. 1 shows a flow chart of a composite manufacturing method 100a with extruding and turning processes according to one embodiment of the present disclosure; FIG. 2A shows one schematic view of a workpiece 102 of a selecting step S12 of the composite manufacturing method 100a of FIG. 1; FIG. 2B shows another schematic view of the workpiece 102 of the selecting step S12 of the composite manufacturing method 100a of FIG. 1; FIG. 3A shows a schematic view of an extruding step S14 of the composite manufacturing method 100a of FIG. 1; FIG. 3B shows another schematic view of the extruding step S14 of the composite manufacturing method 100a of FIG. 1; FIG. 4A shows a schematic view of a turning step S16 of the composite manufacturing method 100a of FIG. 1; and FIG. 4B shows another schematic view of the turning step S16 of the composite manufacturing method 100a of FIG. 1. In FIG. 1, the composite manufacturing method 100a with extruding and turning processes is utilized for extruding and turning a workpiece 102 to manufacture a surgical instrument, such as a shaft of a laparoscopic surgical instrument. The composite manufacturing method 100a includes a selecting step S12, an extruding step S14 and a turning step S16.

The selecting step S12 is for selecting the workpiece 102 made of metal material having an irregular shape, as shown in FIGS. 2A and 2B. The workpiece 102 includes a processing end portion 1022 having a first surface 1022a, a second surface 1022b, a third surface 1022c, a fourth surface 1022d and a fifth surface 1022e. The first surface 1022a is directed in a positive X-axis direction. The second surface 1022b is directed in a negative X-axis direction. The third surface 1022c is directed in a negative Z-axis direction. The fourth surface 1022d is directed in a positive Z-axis direction. The fifth surface 1022e is directed in a positive Y-axis direction.

The extruding step S14 is for extruding the processing end portion 1022 of the workpiece 102 by an extruding apparatus 200 so as to increase an axial length D1 and a radial length D2 of the workpiece 102, as shown in FIGS. 3A and 3B. In detail, the extruding apparatus 200 includes two extruding surfaces 210 corresponding to each other. The workpiece 102 is disposed between the two extruding surfaces 210. The two extruding surfaces 210 are moved toward each other. The first surface 1022a and the second surface 1022b are extruded by the two extruding surfaces 210, respectively. Plural inner extruding forces are formed inside the workpiece 102 during the extruding step S14. The inner extruding forces includes a first inner extruding force F1, a second inner extruding force F2, a third inner extruding force F3 and a fourth inner extruding force F4 which are all transmitted inside the workpiece 102. The third surface 1022c, the fourth surface 1022d and the fifth surface 1022e of the processing end portion 1022 of the workpiece 102 are deformed toward the outside of the processing end portion 1022 by the first inner extruding force F1, the second inner extruding force F2 and the third inner extruding force F3, respectively. In addition, a direction of the first inner extruding force F1 and a direction of the second inner extruding force F2 are opposite to each other. A direction of the third inner extruding force F3 and a direction of the fourth inner extruding force F4 are opposite to each other. The direction of the first inner extruding force F1 and the direction of the fourth inner extruding force F4 are perpendicular to each other. Therefore, the processing end portion 1022 of the workpiece 102 is extruded to increase the axial length D1 and the radial length D2 of the processing end portion 1022. The processing end portion 1022 of the workpiece 102 has a processing length PL which is shorter than the processing length of the conventional method, thus decreasing the processing time and manufacturing cost.

The turning step S16 is for turning the processing end portion 1022 of the extruded workpiece 102 by a lathe apparatus. The extruding apparatus 200 is disposed on the lathe apparatus. In detail, the processing end portion 1022 of the extruded workpiece 102 is turned by a cutting tool 310 of the lathe apparatus. The extruding apparatus 200 is smaller than the lathe apparatus and connected to the lathe apparatus. Moreover, the steps of the composite manufacturing method 100a are carried out in order of the selecting step S12, the extruding step S14 and the turning step S16. Therefore, the duration of processing time from the extruding step S14 to the turning step S16 can be substantially reduced due to the lathe apparatus disposed near the extruding apparatus 200, so that the composite manufacturing method 100a of the present disclosure is relatively suitable for use in mass production.

Figures 6A, 6B:
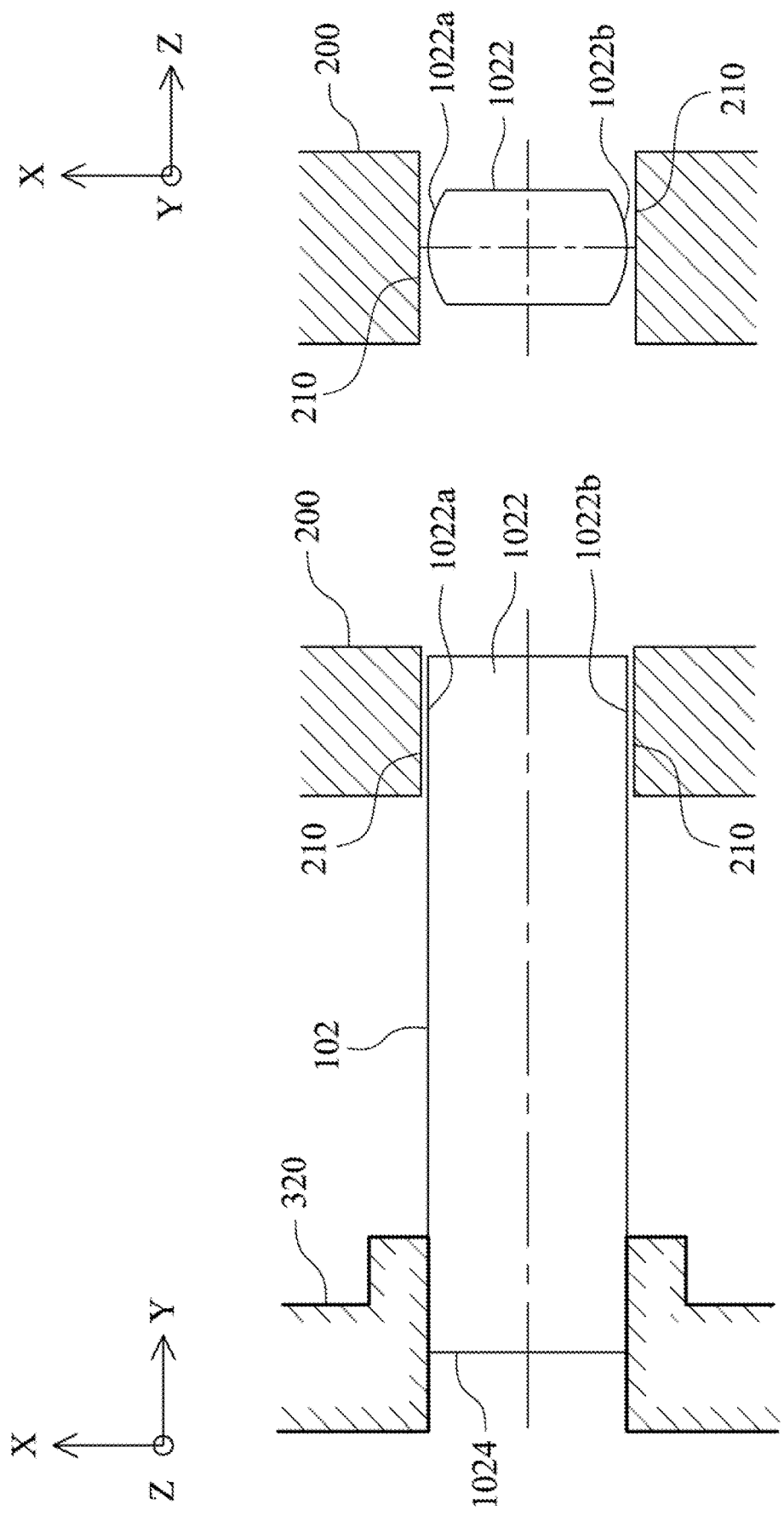
FIG. 6A shows one schematic view of a clamping step of the composite manufacturing method of FIG. 5.
FIG. 6B shows another schematic view of the clamping step of the composite manufacturing method of FIG. 5.
Figures 7A, 7B:
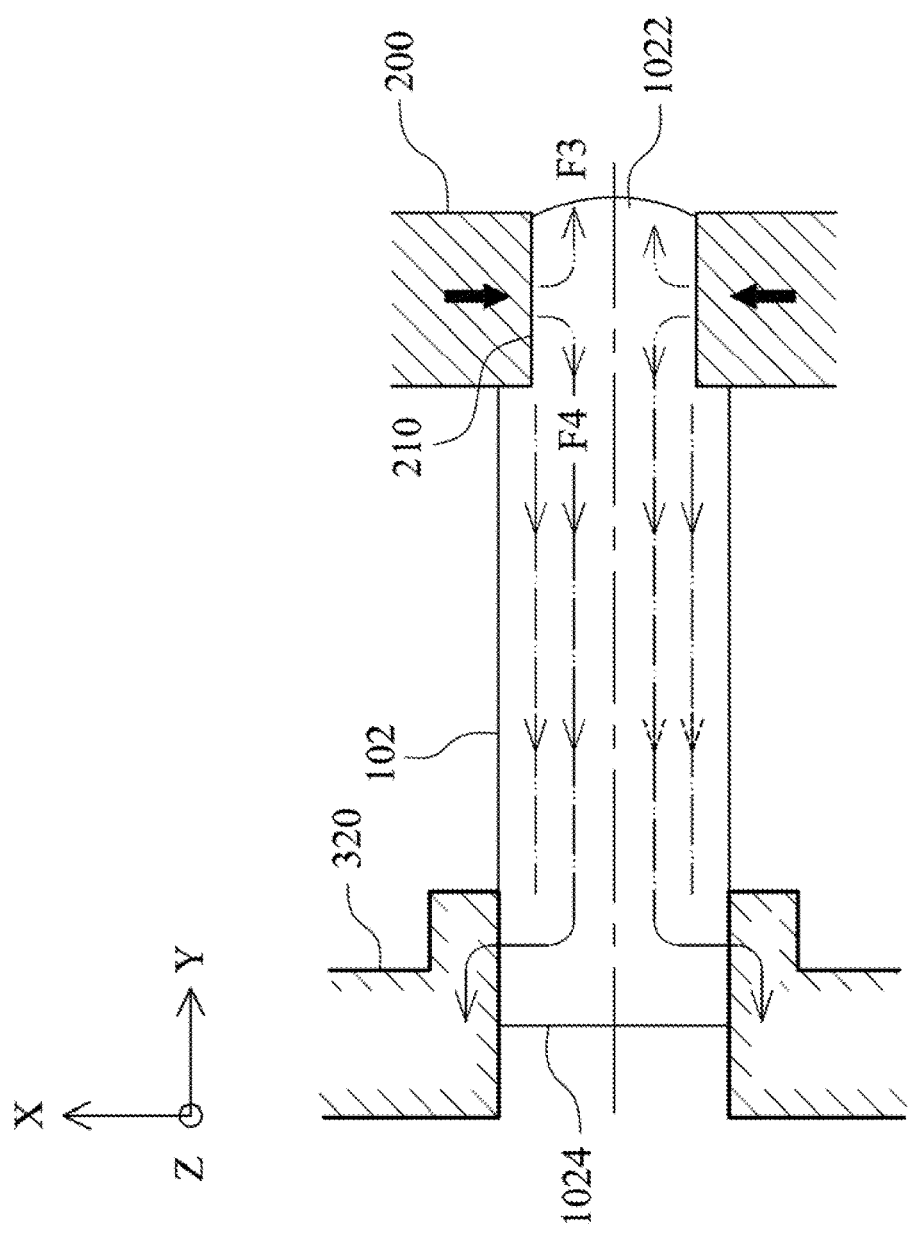
FIG. 7A shows a schematic view of an extruding step of the composite manufacturing method of FIG. 5.
FIG. 7B shows another schematic view of the extruding step of the composite manufacturing method of FIG. 5.

FIG. 5 shows a flow chart of a composite manufacturing method 100b with extruding and turning processes according to another embodiment of the present disclosure; FIG. 6A shows one schematic view of a clamping step S22 of the composite manufacturing method 100b of FIG. 5; FIG. 6B shows another schematic view of the clamping step S22 of the composite manufacturing method 100b of FIG. 5; FIG. 7A shows a schematic view of an extruding step S23 of the composite manufacturing method 100b of FIG. 5; and FIG. 7B shows another schematic view of the extruding step S23 of the composite manufacturing method 100b of FIG. 5. In FIG. 5, the composite manufacturing method 100b includes a selecting step S21, the clamping step S22, the extruding step S23, an apparatus moving step S24 and a turning step S25.

The selecting step S21 is for selecting the workpiece 102 made of metal material having an irregular shape. The workpiece 102 includes a processing end portion 1022 and a clamping portion 1024. The processing end portion 1022 is located at one end of the workpiece 102 and has a first surface 1022a, a second surface 1022b, a third surface 1022c, a fourth surface 1022d and a fifth surface 1022e. The clamping portion 1024 is located at the other end of the workpiece 102.

The clamping step S22 is for positioning the clamping portion 1024 of the workpiece 102 by a lathe chuck 320 of the lathe apparatus, and the lathe chuck 320 is adjacent to and corresponding to the extruding apparatus 200. A distance between the lathe chuck 320 and the extruding apparatus 200 is smaller than the length of the workpiece 102.

The extruding step S23 is for extruding the processing end portion 1022 of the workpiece 102 by an extruding apparatus 200 so as to increase an axial length D1 and a radial length D2 of the workpiece 102. The workpiece 102 is disposed between the two extruding surfaces 210.

The apparatus moving step S24 is for moving the extruding apparatus 200 away from the workpiece 102, and then moving a cutting tool 310 of the lathe apparatus close to the workpiece 102 and connecting the cutting tool 310 of the lathe apparatus with the workpiece 102 so as to turn the extruded workpiece 102 by the cutting tool 310 of the lathe apparatus. In other words, the workpiece 102 is positioned by the lathe chuck 320 of the lathe apparatus. The extruding apparatus 200 or the cutting tool 310 is moved by the lathe apparatus according to the process which needs to be performed.

The turning step S25 is for the processing end portion 1022 of the extruded workpiece 102 is turned by the cutting tool 310 of the lathe apparatus. In addition, the steps of the composite manufacturing method 100b are carried out in order of the selecting step S21, the clamping step S22, the extruding step S23, the apparatus moving step S24 and the turning step S25. The extruding apparatus 200 is disposed on the lathe apparatus, so that the duration of processing time from the extruding step S23 to the turning step S25 can be decreased.

Figure 8:
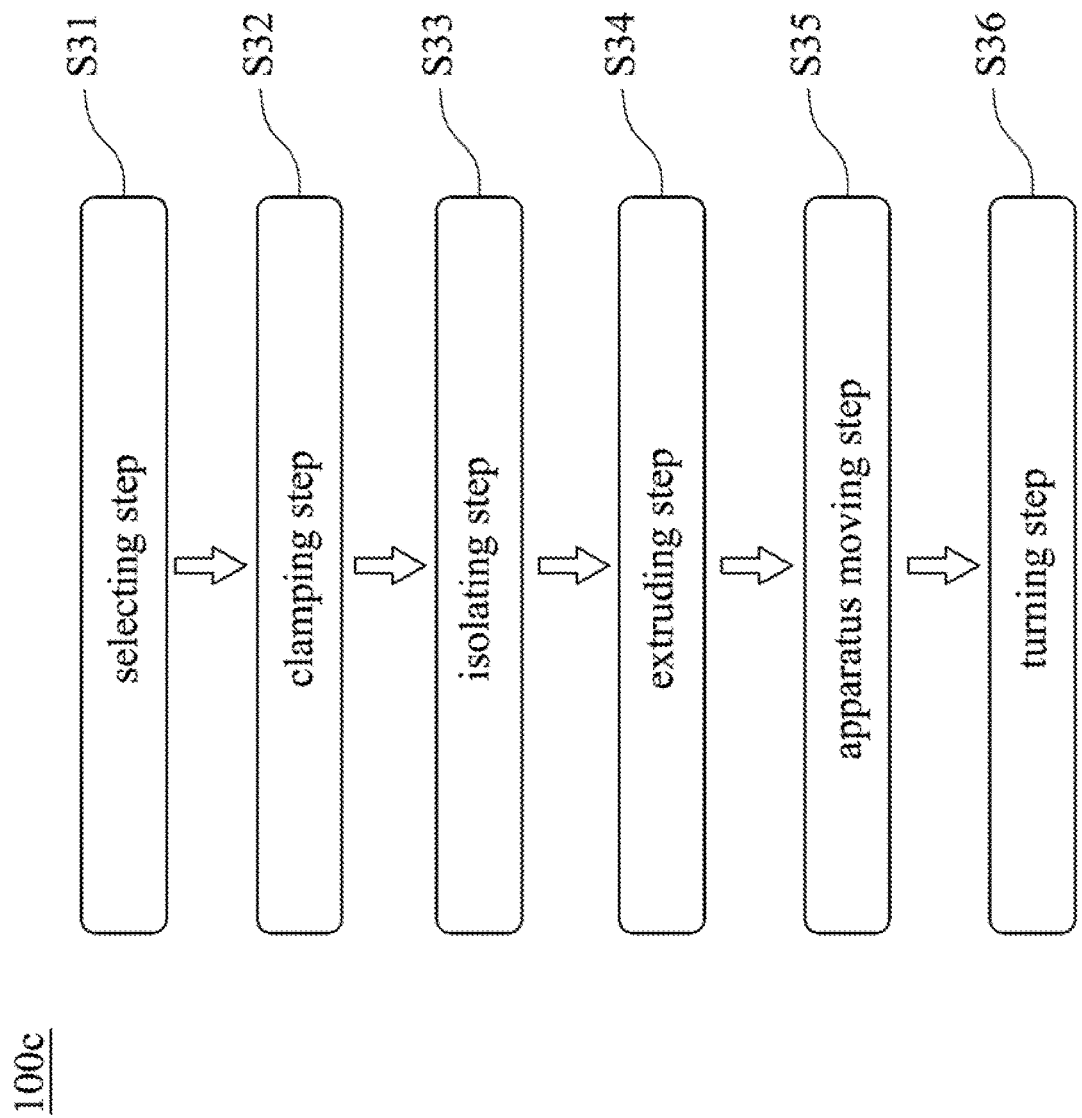
FIG. 8 shows a flow chart of a composite manufacturing method with extruding and turning processes according to further another embodiment of the present disclosure.
Figure 9B:
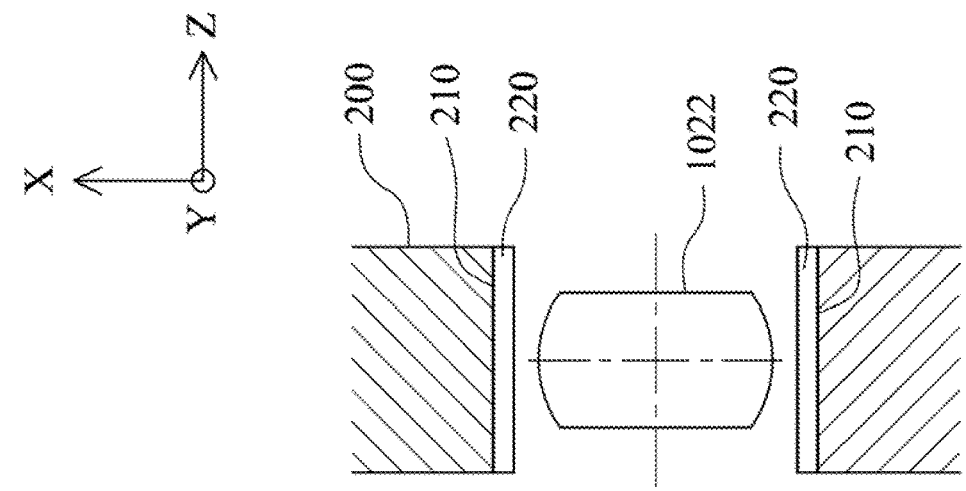
FIG. 9B shows another schematic view of the clamping step of the composite manufacturing method of FIG. 8.
Figure 9A:
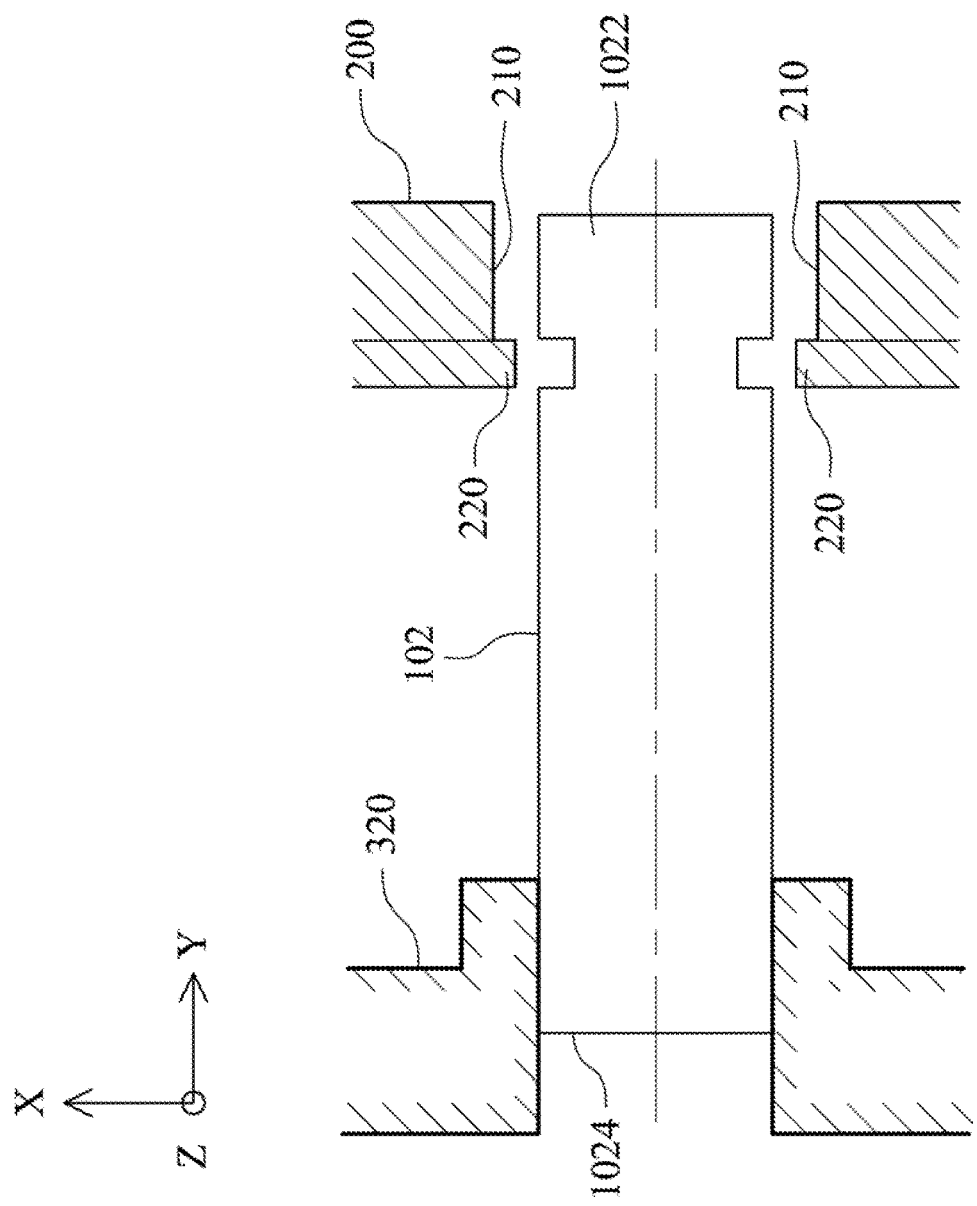
FIG. 9A shows one schematic view of a clamping step of a composite manufacturing method of FIG. 8.

FIG. 8 shows a flow chart of a composite manufacturing method 100c with extruding and turning processes according to further another embodiment of the present disclosure; FIG. 9A shows one schematic view of a clamping step S32 of the composite manufacturing method 100c of FIG. 8; FIG. 9B shows another schematic view of the clamping step S32 of the composite manufacturing method 100c of FIG. 8; FIG. 10A shows a schematic view of an isolating step S33 and an extruding step S34 of the composite manufacturing method of FIG. 8; and FIG. 10B shows another schematic view of the isolating step S33 and the extruding step S34 of the composite manufacturing method of FIG. 8. In FIG. 8, the composite manufacturing method 100c includes a selecting step S31, the clamping step S32, the isolating step S33, the extruding step S34, an apparatus moving step S35 and a turning step S36.

In FIG. 8, the details of the selecting step S31, the clamping step S32, the apparatus moving step S35 and the turning step S36 are the same as the selecting step S21, the clamping step S22, the apparatus moving step S24 and the turning step S25 of FIG. 5, respectively. In FIG. 8, the composite manufacturing method 100c further includes the isolating step S33 and the extruding step S34. The isolating step S33 is for blocking a lathe extruding force F4a via an isolating portion 220 of an extruding apparatus 200. The extruding step S34 is for extruding a processing end portion 1022 of the workpiece 102 by the extruding apparatus 200 and generating the lathe extruding force F4a transmitted toward a clamping portion 1024 of the workpiece 102. In FIG. 10A, the isolating portion 220 of the extruding apparatus 200 has a convex shape. After extruding the processing end portion 1022, a recess 1026 may be formed on the processing end portion 1022 via the isolating portion 220. The recess 1026 is corresponding to the isolating portion 220. Furthermore, there are plural inner extruding forces formed in the workpiece 102 during the extruding step S34. The inner extruding forces includes a first inner extruding force F1, a second inner extruding force F2, a third inner extruding force F3 and the lathe extruding force F4a which are all transmitted inside the workpiece 102. A direction of the third inner extruding force F3 and a direction of the lathe extruding force F4a are opposite to each other. A direction of the first inner extruding force F1 and a direction of the second inner extruding force F2 are opposite to each other. The direction of the first inner extruding force F1 and the direction of the lathe extruding force F4a are perpendicular to each other. In addition, the steps of the composite manufacturing method 100c are carried out in order of the selecting step S31, the clamping step S32, the isolating step S33, the extruding step S34, the apparatus moving step S35 and a turning step S36. In FIGS. 9A-10B, the extruding apparatus 200 has a semi-open structure. When the extruding apparatus 200 is used for extruding the processing end portion 1022, the isolating portion 220 of the extruding apparatus 200 prevents the lathe extruding force F4a from transmitting to a lathe chuck 320 of the lathe apparatus, thus increasing the lifetime of the lathe apparatus.

Figure 11A:
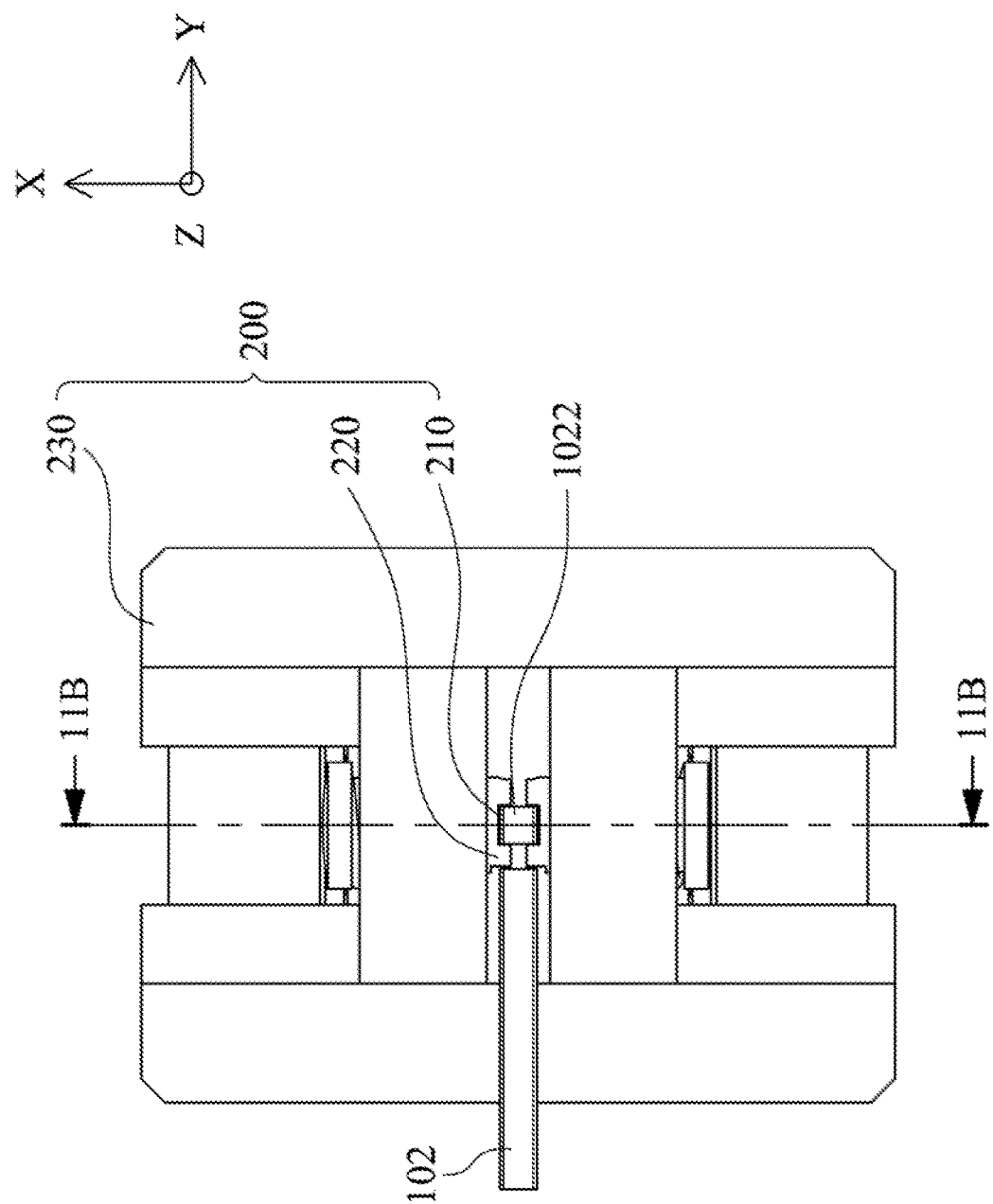
FIG. 11A shows a schematic view of an extruding apparatus according to one embodiment of the present disclosure.
Figure 11B:
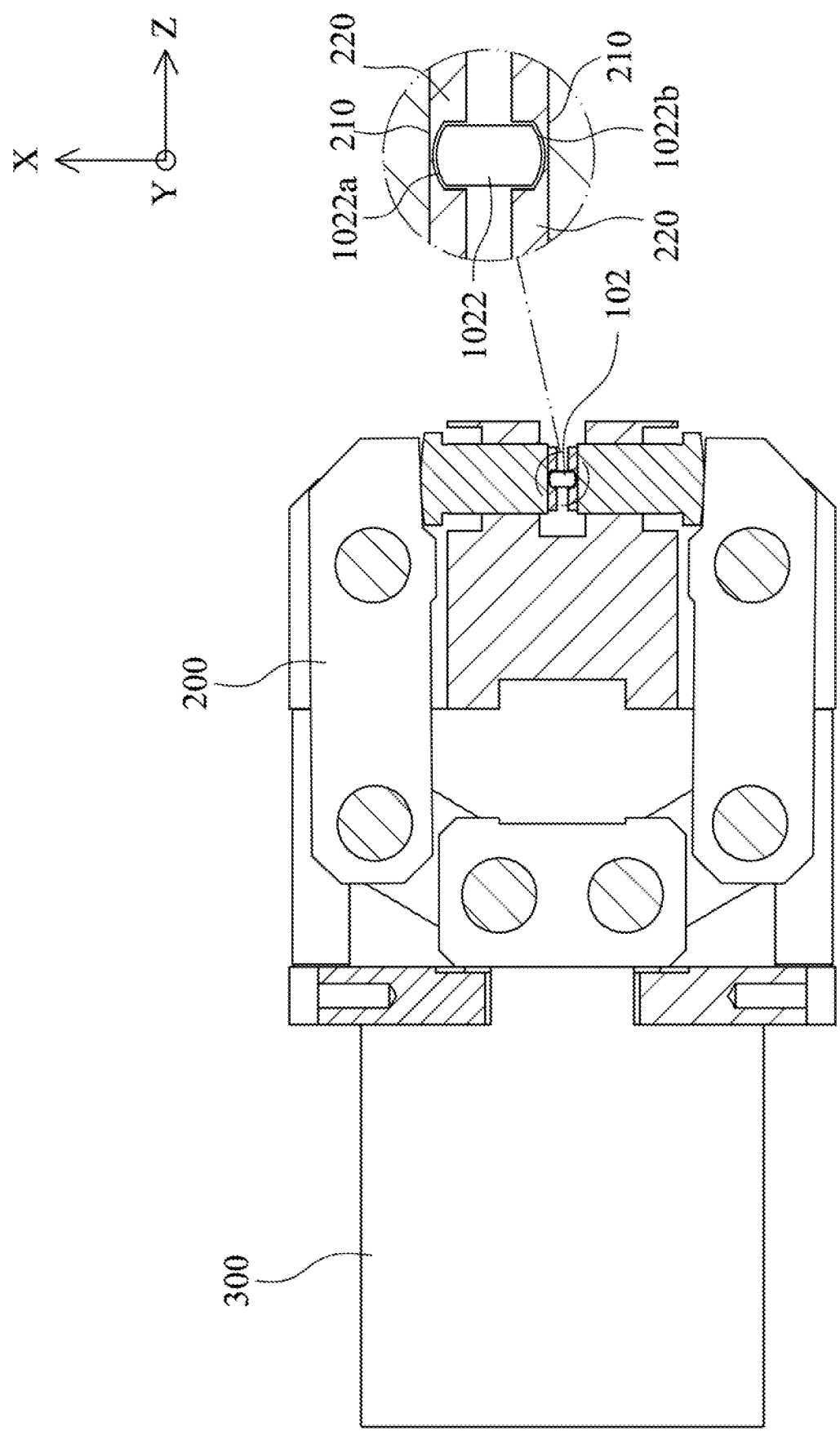
FIG. 11B shows a cross-sectional view of the extruding apparatus with the extruding process of FIG. 11A.
Figure 11C:
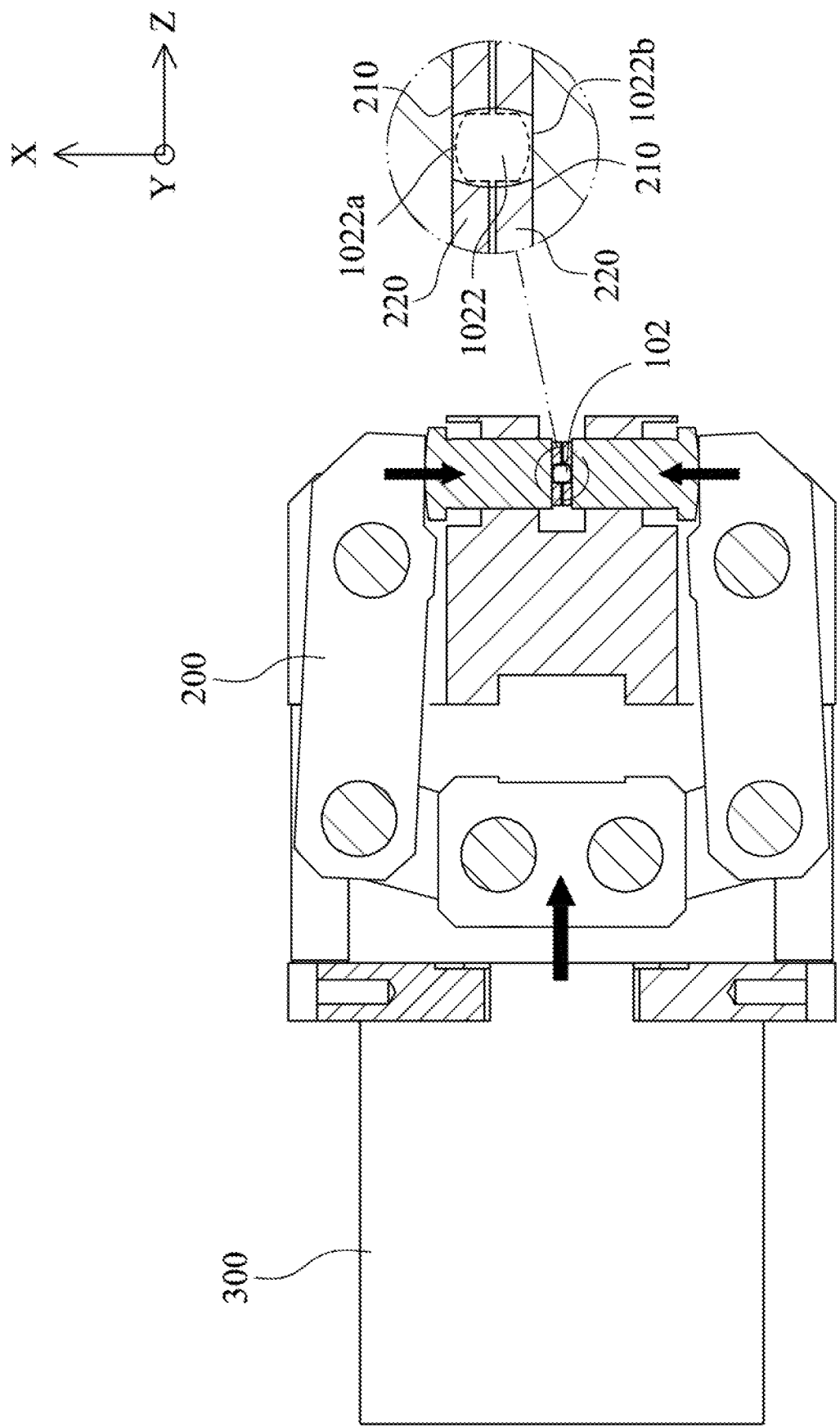
FIG. 11C shows a cross-sectional view of the extruding apparatus without the extruding process of FIG. 11A.

FIG. 11A shows a schematic view of an extruding apparatus 200 according to one embodiment of the present disclosure; FIG. 11B shows a cross-sectional view of the extruding apparatus 200 with the extruding process of FIG. 11A; and FIG. 11C shows a cross-sectional view of the extruding apparatus 200 without the extruding process of FIG. 11A. In FIGS. 11A-11C, the extruding apparatus 200 includes two extruding surfaces 210, two isolating portions 220 and an extruding module 230. The isolating portions 220 are connected to the extruding module 230. The two extruding surfaces 210 are corresponding to each other. The processing end portion 1022 of the workpiece 102 is disposed between the two extruding surfaces 210. The two extruding surfaces 210 are moved toward each other, so that the first surface 1022a and the second surface 1022b are extruded by the two extruding surfaces 210, respectively. Any type of extruding apparatus 200 which can be disposed on the lathe apparatus 300 and can manufacture the required shape of the workpiece 102 may be used in the present disclosure.

According to the aforementioned embodiments and examples, the advantages of the present disclosure are described as follows.

1. The composite manufacturing method of the present disclosure uses the extruding process to extrude the workpiece firstly, and then performing the turning process to turn the extruded workpiece, thus decreasing the processing time and manufacturing cost.

2. The composite manufacturing method of the present disclosure uses the isolating portion of the extruding apparatus to prevent the inner extruding force from transmitting to the lathe apparatus, thereby increasing the lifetime of the lathe apparatus.

3. The composite manufacturing method of the present disclosure utilizes the extruding apparatus disposed on the lathe apparatus, so that the duration of processing time from the extruding step to the turning step can be decreased.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A composite manufacturing method with extruding and turning process for extruding a workpiece, turning the workpiece and manufacturing a surgical instrument, the composite manufacturing method comprising:
   providing an extruding step, wherein the extruding step is for extruding a processing end portion of the workpiece by an extruding apparatus so as to increase a radial length and an axial length of the workpiece, and the processing end portion of the workpiece has a processing length; and
   providing a turning step, wherein the turning step is for turning the processing end portion of the extruded workpiece by a lathe apparatus;
   wherein the extruding apparatus is screwedly disposed on the lathe apparatus.

2. The composite manufacturing method of claim 1, further comprising:
   providing a selecting step, wherein the selecting step is for selecting the workpiece made of metal material before the extruding step.

3. The composite manufacturing method of claim 1, further comprising:
   providing an apparatus moving step, wherein the apparatus moving step is for moving the extruding apparatus away from the workpiece, and then moving the lathe apparatus close to the workpiece and connecting the lathe apparatus with the workpiece so as to turn the extruded workpiece by the lathe apparatus.

4. The composite manufacturing method of claim 1, further comprising:
providing a clamping step, wherein the clamping step is for positioning a clamping portion of the workpiece by a lathe chuck of the lathe apparatus, and the lathe chuck is adjacent to and corresponding to the extruding apparatus.

5. The composite manufacturing method of claim 4, wherein the steps of the composite manufacturing method are carried out in order of the clamping step, the extruding step and the turning step.

6. The composite manufacturing method of claim 1, wherein,
in the extruding step, the extruding apparatus comprises two extruding surfaces corresponding to each other, the workpiece is disposed between the two extruding surfaces, the two extruding surfaces are moved toward each other, the processing end portion of the workpiece has a first surface and a second surface which are extruded by the two extruding surfaces, respectively, and a plurality of inner extruding forces are produced in the workpiece during the extruding step, the first surface is directed in a positive X-axis direction, and the second surface is directed in a negative X-axis direction.

7. The composite manufacturing method of claim 6, wherein,
the inner extruding forces comprising a first inner extruding force, a second inner extruding force and a third inner extruding force which are all transmitted inside the workpiece; and
the processing end portion of the workpiece having a third surface, a fourth surface and a fifth surface which are deformed toward an outside of the processing end portion by the first inner extruding force, the second inner extruding force and the third inner extruding force, respectively, the third surface is directed in a negative Z-axis direction, the fourth surface is directed in a positive Z-axis direction, and the fifth surface is directed in a positive Y-axis direction.

* * * * *